March 5, 1929.  W. L. MORELAND  1,704,301
MOTOR VEHICLE
Filed June 13, 1927  2 Sheets-Sheet 1

INVENTOR
Watt L. Moreland

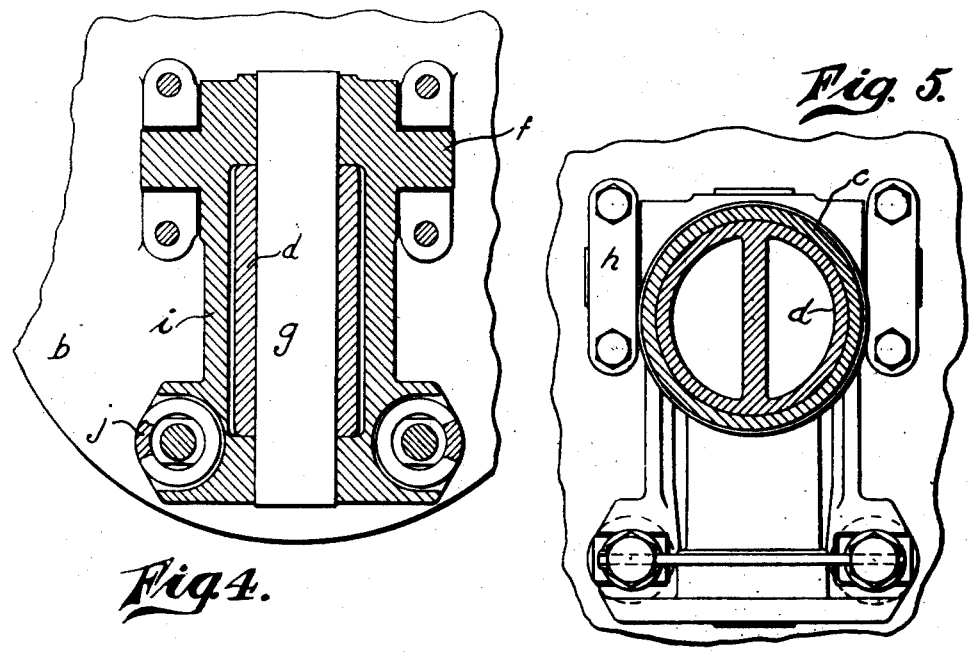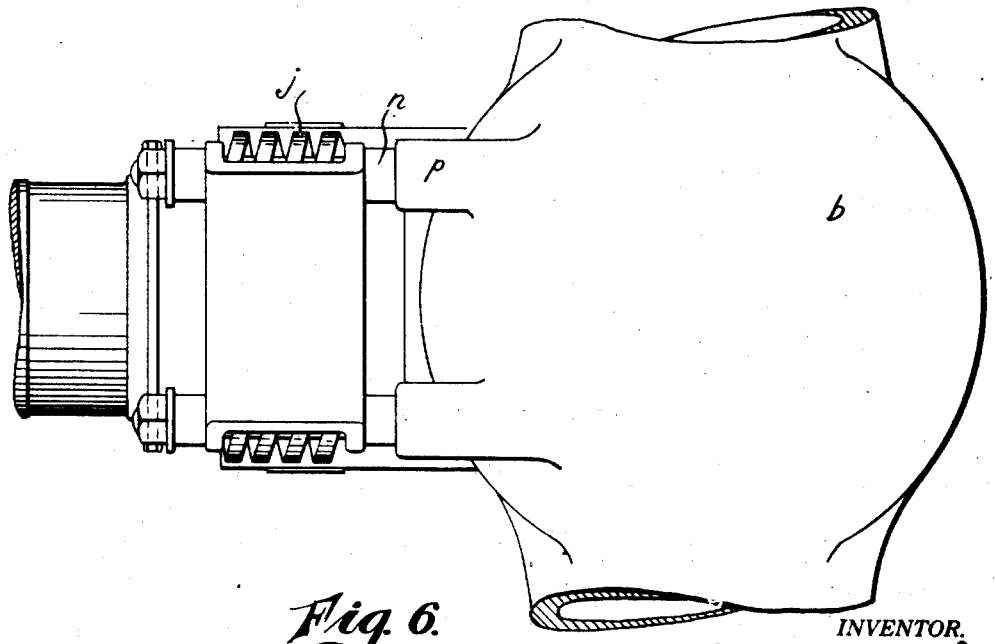

Patented Mar. 5, 1929.

1,704,301

UNITED STATES PATENT OFFICE.

WATT L. MORELAND, OF LOS ANGELES, CALIFORNIA, ASSIGNOR OF ONE-HALF TO MORELAND MOTOR TRUCK COMPANY, OF BURBANK, CALIFORNIA.

MOTOR VEHICLE.

Application filed June 13, 1927. Serial No. 198,578.

My invention relates to improvements in motor vehicles and more specifically in mechanism for neutralizing the torque effects in vehicles which are provided with a plurality of live axles.

The object of my invention is a flexible torque neutralizing mechanism which will permit a certain amount of give in the driving axle housings when the torque reaction exceeds a certain magnitude.

In carrying my invention into practice, I provide springs between the torque member and the axle housings, which are compressed under the influence of the torque reaction, thereby permitting such axle housings to oscillate slightly around the axles.

Figure 1:
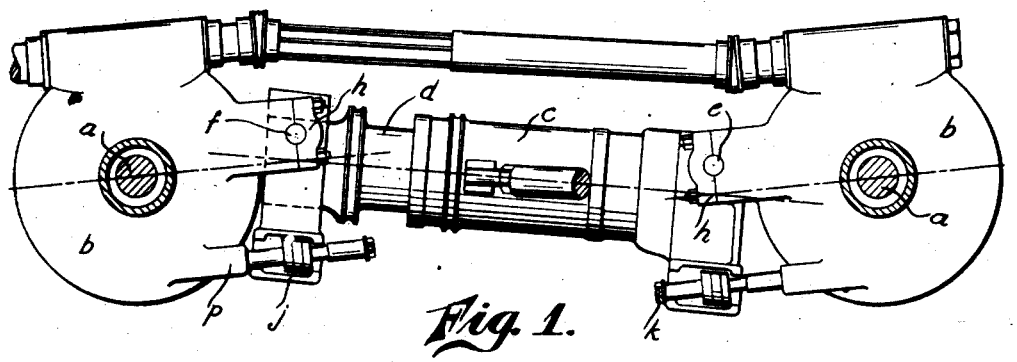
Figure 2:
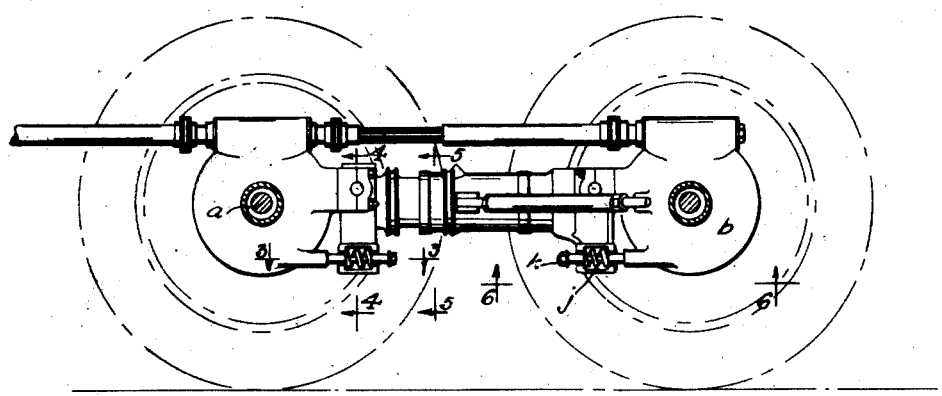
Figure 3:
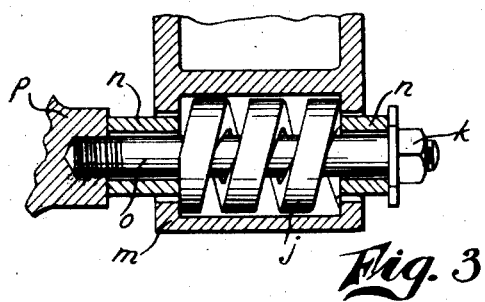

In the drawings, Fig. 1 shows a side view of the two driving axles with the interconnecting torque member and drive shaft as described in my pending application, Serial No. 75,408, filed Dec. 14, 1925; the axles are here shown under extreme torque effect. Fig. 2 is a side view of the two rear axles, torque member and drive shaft, with the axle housings in their normal position. Fig. 3 is a detail through section 3—3 of Fig. 2; Fig. 4 a section through 4—4 of Fig. 2; Fig. 5 a sectional view through 5—5 of Fig. 2, while Fig. 6 is an inverted view of a portion of the axle housing with the torque neutralizing springs in view.

In the drawings, like symbols designate corresponding parts throughout each of the several views. $a$—$a$ represents the live axles, $b$—$b$ the axle housings. The torque member is composed of two parts, the cylindrical portion $c$, and the piston $d$ which is free to slide to and fro and to turn in $c$.

Part $c$ is capable of pivotal motion around shaft $e$, while $d$ can pivot around axis stubs $f$ as well as around vertical shaft $g$ (see Fig. 4). $e$ and $f$ are held to axle housings by bearing caps $h$ which are fastened down by means of studs or nuts in the usual manner.

Axis stubs $f$ form part of oscillator $i$, which supports vertical shaft $g$ and through stubs $f$ is connected with the axle housing, permitting $d$ to oscillate vertically as well as horizontally. Springs $j$ are normally in a fairly high compressed state depending on the tension that it is desired to give them by means of nuts $k$. In operation, when the torque reaction in any one or both axles should exceed a predetermined limit, the springs will be compressed, as shown in Fig. 1, permitting the axle housings to slightly turn, clockwise or counterclockwise, as the case may be, when the wheels are driven forward or backward, or when the brakes are applied.

The spring housing $m$ (see Fig. 3) holds the spring $j$ in position and allows it to be compressed from the right or the left, through collars $n$ seated on stud $o$. Since one of said collars is located at the right of the spring, and another on the left, it is evident from the drawing that the spring will be compressed whether extension $p$ of axle housing moves to the right or the left.

On account of the give in the springs and the slight oscillation of the axle housings, the stresses in the axles are greatly reduced and a more flexible drive is obtained.

Having now described my invention, what I claim as new and desire to protect by Letters Patent is:

1. In a vehicle chassis, in combination, a plurality of live axles, housings for said axles, a torque neutralizing member composed of two parts in sliding connection with each other for connecting said axle housings with each other, said member composed of two main parts, one of said parts connected with one axle housing to permit horizontal and vertical oscillation between it and the axle housing and the other part permitting horizontal oscillation between it and the other axle housing.

2. In a vehicle chassis, in combination, a plurality of live axles, housings for said axles, a torque neutralizing member connecting said axle housings with each other, said member composed of two main parts, one of said parts connected with one axle housing to permit horizontal and vertical oscillation between it and the axle housing and the other part permitting horizontal oscillation between it and the other axle housing, springs between the axle housings and the torque member to cushion the vertical oscillation between them.

WATT L. MORELAND.